(12) United States Patent
Suzuki et al.

(10) Patent No.: US 9,829,065 B2
(45) Date of Patent: Nov. 28, 2017

(54) TORSIONAL VIBRATION REDUCING DEVICE

(71) Applicant: Toyota Jidosha Kabushiki Kaisha, Toyota-shi (JP)

(72) Inventors: Yuji Suzuki, Kariya (JP); Hiroyuki Amano, Susono (JP); Yu Miyahara, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/969,149

(22) Filed: Dec. 15, 2015

(65) Prior Publication Data

US 2016/0169320 A1 Jun. 16, 2016

(30) Foreign Application Priority Data

Dec. 16, 2014 (JP) .................................. 2014-253729

(51) Int. Cl.
*F16F 7/10* (2006.01)
*F16F 15/14* (2006.01)

(52) U.S. Cl.
CPC .................................. *F16F 15/145* (2013.01)

(58) Field of Classification Search
CPC ...... F16F 15/145; F16F 15/14; F16F 15/1457; F16F 15/163; F16F 15/16; F16F 15/162; F16F 15/165; F16H 57/0404; F16H 57/0402; Y10T 74/2121; Y10T 74/128
USPC .......... 188/378, 379, 380; 192/70.17, 160 F; 74/572–574; 464/24, 62.1, 65.1, 82
See application file for complete search history.

(56) References Cited

U.S. PATENT DOCUMENTS

| | | | |
|---|---|---|---|
| 6,382,050 B1 * | 5/2002 | Carlson .................. | F16F 15/145 464/24 |
| 6,427,656 B1 * | 8/2002 | Drecq .................... | F16F 15/145 123/192.1 |
| 7,004,294 B2 * | 2/2006 | Williams ............... | F16F 15/145 188/378 |
| 9,435,397 B2 * | 9/2016 | Aijima ................... | F16F 15/145 |

(Continued)

FOREIGN PATENT DOCUMENTS

| | | |
|---|---|---|
| JP | 10-231895 A | 9/1998 |
| JP | 2012-145190 | 8/2012 |

(Continued)

*Primary Examiner* — Pamela Rodriguez
(74) *Attorney, Agent, or Firm* — Oblon, McClelland, Maier & Neustadt, L.L.P.

(57) ABSTRACT

A torsional vibration reducing device includes a rotating body, and a connection member. The rotating body has a plurality of guide holes. The rotating body includes a plurality of rolling bodies that are accommodated in the plurality of guide holes, respectively. The connection member connects the plurality of rolling bodies such that the plurality of rolling bodies moves integrally in the rotating direction of the rotating body. The connection member is supported so as to be reciprocally swingable in the rotating direction. A first moment that results from a weight of any one of the plurality of rolling bodies and rotates the connection member in a first rotating direction, a second moment that results from a weight of the other of the plurality of rolling bodies and rotates the connection member in a second rotating direction being applied to the connection member.

7 Claims, 8 Drawing Sheets (56) References Cited

U.S. PATENT DOCUMENTS

| | | | | |
|---|---|---|---|---|
| 2012/0222515 A1* | 9/2012 | Kinoshita | ............ | F16F 15/145 |
| | | | | 74/572.2 |
| 2012/0304808 A1* | 12/2012 | Amano | ............... | F16F 15/1457 |
| | | | | 74/574.2 |
| 2014/0066216 A1 | 3/2014 | Tone et al. | | |
| 2016/0169318 A1* | 6/2016 | Miyahara | ............. | F16F 15/145 |
| | | | | 188/378 |

FOREIGN PATENT DOCUMENTS

| | | |
|---|---|---|
| JP | 2013-185653 | 9/2013 |
| JP | 2014-47805 | 3/2014 |
| JP | 2014-105806 A | 6/2014 |
| JP | 2014-152836 A | 8/2014 |

* cited by examiner

TORSIONAL VIBRATION REDUCING DEVICE

INCORPORATION BY REFERENCE

The disclosure of Japanese Patent Application No. 2014-253729 filed on Dec. 16, 2014 including the specification, drawings and abstract is incorporated herein by reference in its entirety.

BACKGROUND OF THE INVENTION

1. Field of the Invention

The invention relates to a device that reduces torsional vibration by a reciprocating motion or a pendulum motion of an inertial mass body.

2. Description of Related Art

Japanese Patent Application Publication Nos. 2012-145190 and 2013-185653 disclose a torsional vibration reducing device configured to reduce torsional vibration by pressing a mass body having a disk shape or a cylindrical shape with a short axial length against a rolling surface of a rotating body that receives the torsional vibration by a centrifugal force, and reciprocating the mass body in a circumferential direction along the rolling surface when torque fluctuates. The rolling surface in the device described in JP 2012-145190 A and JP 2013-185653 A is formed in an inner wall portion on an outer side in a radial direction of the rotating body out of inner wall portions of each of accommodating chambers formed so as to be arranged at predetermined intervals in the circumferential direction of the rotating body. In a device described in Japanese Patent Application Publication No. 2014-47805, a rolling surface is composed of a first rolling guide surface and a second rolling guide surface having different arc shapes from each other. The first and second rolling guide surfaces are continuous in a circumferential direction, and are alternately formed.

In a device in which a rolling body is disposed in an accommodating chamber, and vibration is reduced by a reciprocating motion of the rolling body, the rolling body is configured to be freely movable within the accommodating chamber. Therefore, when a rotating body rotates, the rolling body is pressed against a rolling surface by a centrifugal force. When acceleration in a rotating direction is generated by fluctuations in torque of the rotating body in the above state, the rolling body moves along the rolling surface. An operating state as described above is generated when a rotation speed of the rotating body is relatively high, and the centrifugal force applied to the rolling body is thus large enough to press the rolling body against the rolling surface. In other words, when the centrifugal force is not sufficiently large, the rolling body falls to a lowest portion in each accommodating chamber by gravity. When the rotating body is stopped, the rolling body remains in the lowest portion in the accommodating chamber. On the other hand, in a case in which the rotating body rotates at a rotation speed at which a sufficient centrifugal force is not applied to the rolling body, an orientation in a vertical direction of the accommodating chamber is reversed when the accommodating chamber starts to descend after reaching a top portion in the rotating direction. Thus, the rolling body in the accommodating chamber falls to a lowest portion in the accommodating chamber. In the device described in JP 2012-145190 A and JP 2013-185653 A, in a case in which the plurality of accommodating chambers are independent of each other, and a partition wall portion is provided between the respective accommodating chambers, the rolling body may generate noise or abnormal sound by colliding with the partition wall portion when the rolling body falls as described above. In the device described in JP 2014-47805 A, since the rolling surface is continuous over an entire periphery of the rotating body, a connection member is provided so as to separate the rolling bodies, so that collision of the rolling bodies with each other, and generation of abnormal sound resulting from the collision are prevented. That is, in a configuration described in JP 2014-47805 A, since a portion corresponding to the partition wall portion with which the rolling body collides does not exist, the falling of the rolling body by gravity when the rotation speed is low, and the generation of the abnormal sound resulting from the falling do not possibly occur.

SUMMARY OF THE INVENTION

The invention provides a torsional vibration reducing device that can prevent or suppress generation of abnormal sound with a rolling body colliding with an inner surface of an accommodating chamber by gravity.

A first aspect of the invention provide a torsional vibration reducing device includes a rotating body and a connection member. The rotating body has a plurality of guide holes. The plurality of guide holes are provided at a predetermined interval in a circumferential direction of the rotating body. The rotating body includes a plurality of rolling bodies. The plurality of rolling bodies is accommodated in the plurality of guide holes, respectively. The plurality of rolling bodies is configured to roll in a rotating direction of the rotating body when the torque fluctuates while the rotating body is rotating. The connection member connects the plurality of rolling bodies such that the plurality of rolling bodies moves integrally in the rotating direction of the rotating body. The connection member is supported so as to be reciprocally swingable in the rotating direction, a first moment that results from a weight of any one of the plurality of rolling bodies and rotates the connection member in a first rotating direction about the center of rotation of the rotating body, a second moment that results from a weight of the other of the plurality of rolling bodies and rotates the connection member in a second rotating direction opposite to the first rotating direction about the center of rotation of the rotating body, and the first moment and the second moment are applied to the connection member.

In the torsional vibration reducing device, the connection member may be configured such that the center of gravity of a constituent body composed of the connection member and the plurality of rolling bodies connected by the connection member is positioned closer to the center of rotation of the rotating body than a position of the center of gravity of any one of the plurality of rolling bodies.

In the torsional vibration reducing device, the connection member may be supported by the rotating body or a member integrated with the rotating body, and two rolling bodies provided on sides opposite to each other with respect to the center of rotation of the rotating body may be connected by the connection member.

In the torsional vibration reducing device, the plurality of rolling bodies may include at least three rolling bodies, and the at least three rolling bodies may be arranged in the rotating direction of the rotating body.

In the torsional vibration reducing device, the connection member may have a hole, the hole being disposed at a position shifted in a radial direction of the rotating body from a center portion of the connection member, and each of the rolling bodies may be held by the connection member so as to be movable in the radial direction of the rotating body in point contact or line contact with an inner surface of the hole on both of front and rear sides in the rotating direction of the rotating body.

In the torsional vibration reducing device, the connection body may be supported by the rotating body so as to rotate relative to the rotating body about the center of rotation of the rotating body.

The torsional vibration reducing device may further includes a cover that covers a position where the rolling bodies are provided in an outer peripheral portion of the rolling body, the cover being provided integrally with the rotating body. The connection member may be accommodated in the cover, and the connection member is supported by the cover so as to rotate relative to the rotating body about the center of rotation of the rotating body.

In accordance with the above configuration, a moment that results from a weight of one of the rolling bodies connected by the connection member and rotates the connection member about the rotation center of the rotating body is applied to the connection member, and at the same time, a moment that results from a weight of the other of the rolling bodies and rotates the connection member about the rotation center of the rotating body is applied to the connection member. Directions of the moments are opposite to each other. Therefore, the center of gravity when the rolling bodies and the connection member are viewed as one constituent body is set to a position close to the rotation center of the rotating body. As a result, movement in a direction in which the rolling body falls in an accommodating chamber is restricted. Thus, even when the rotating body rotates at a rotation speed at which a centrifugal force large enough to press the rolling body against the rolling surface is not generated, it is possible to prevent or suppress collision of the rolling body with a boundary surface that defines the accommodating chamber, and generation of collision sound resulting from the collision.

In a configuration in which the rolling body can move in the radial direction of the rotating body with respect to the connection member, the rolling body positioned above a horizontal plane passing through the rotation center of the rotating body is biased to the rotation center side of the rotating body with respect to the connection member. On the other hand, the rolling body positioned below the horizontal plane is biased in a direction away from the rotation center of the rotating body with respect to the connection member. Therefore, a moment obtained by the lower rolling body becomes larger than a moment obtained by the upper rolling body, so that rotation of the connection member in a direction in which the upper rolling body falls in the accommodating chamber for the rolling body is suppressed. That is, falling of the rolling body in the accommodating chamber passing through a top portion in a rotating plane of the rotating body is restricted, and generation of collision sound with the rolling body colliding with an inner wall surface of the accommodating chamber is suppressed.

By rotatably holding the connection member by the rotating body or the cover member, the connection member is prevented from causing generation of abnormal sound.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
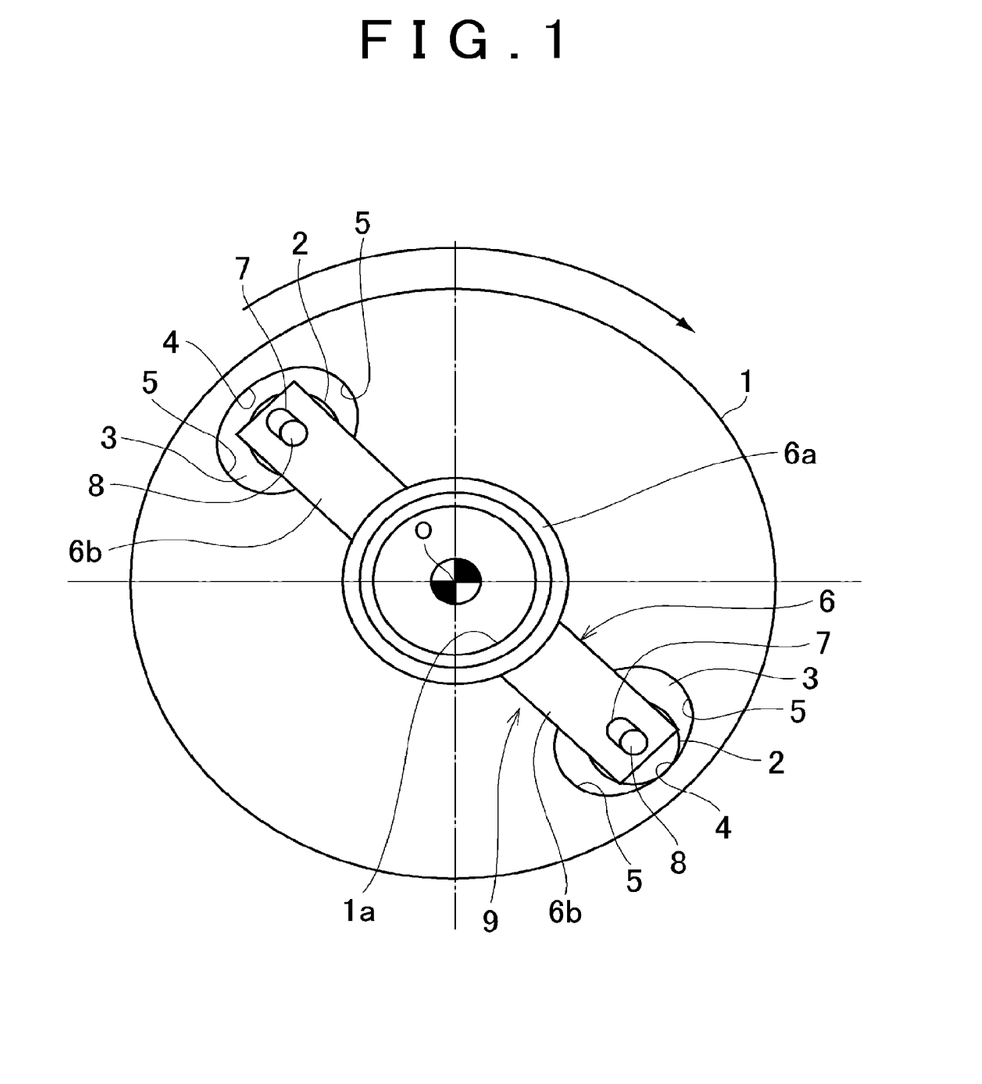
FIG. 1 is a schematic view illustrating one embodiment.

An embodiment will be described by reference to the drawings. FIG. 1 is a schematic view illustrating in principle a torsional vibration reducing device according to the embodiment. A plurality of rolling bodies (inertial mass bodies: masses) 2 are held in a guide plate 1. The guide plate 1 is one example of a rotating body. The guide plate 1 has a disk shape. The guide plate 1 receives torque to rotate, and torsionally vibrates with fluctuations in the torque. The guide plate 1 is attached to a rotating shaft such as a crankshaft of an engine (not shown) or a propeller shaft and an axle that transmit a driving force to wheels (not shown) such that a rotation centerline of the guide plate 1 is oriented horizontally or laterally. Therefore, the guide plate 1 is configured to rotate within a plane along a vertical direction in FIG. 1. A plurality of guide holes 3 (one example of an accommodating chamber) are formed so as to be arranged in a circumferential direction of the guide plate 1 at positions radially shifted from a rotation center O of the guide plate 1, that is, on a circumference having a predetermined radius. In an example shown in FIG. 1, two guide holes 3 are formed at positions facing each other on a diameter with the rotation center O therebetween, in other words, at point-symmetrical positions with respect to the rotation center O.

The guide holes 3 have an appropriate shape and an appropriate size for enabling the rolling body 2 disposed within each of the guide holes 3 to roll (reciprocally swing) in a predetermined range. The guide holes 3 are formed passing through the guide plate 1 in a plate thickness direction of the guide plate 1. Note that the shape may be a so-called elongated hole shape as shown in the drawings, or may be a simple circular shape. An inner wall surface on an outer side in a radial direction of the guide plate 1 out of inner wall surfaces of each of the guide holes 3 is a rolling surface 4 against which each of the rolling bodies 2 is pressed by a centrifugal force, and along which the rolling body 2 is reciprocated by the fluctuations in the torque (that is, the torsional vibration) of the guide plate 1. The rolling surface 4 is an arc surface having a smaller radius than a dimension from the rotation center O to the rolling surface 4 (that is, a radius in the guide plate 1) or a curved surface approximating the arc surface. Inner wall surfaces on opposite sides continuous to the rolling surface 4 are boundary surfaces 5 that define each of the guide holes 3. Each of the rolling bodies 2 is configured to roll up to the boundary surfaces 5, or between the boundary surfaces 5.

The rolling bodies 2 are members that are formed in a circular shape in section, such as a cylindrical shape having a short axial length or a disk shape, so as to roll along the rolling surfaces 4. Note that the rolling bodies 2 may be configured to have an "H" shape in section by providing flange portions on opposite sides of each of the rolling bodes 2 in an axial direction of the rolling body 2. In the configuration, an outer peripheral surface between the flange portions comes into contact with the rolling surface 4 and rolls along the rolling surface 4, and the flange portions are caught by opposite side surfaces of the guide plate 1 in contact therewith. Accordingly, it is possible to suppress escape of the rolling bodies 2 from the guide holes 3 in the axial direction. An outer diameter of the rolling bodies 2 is set to be slightly smaller than a dimension of a position having a smallest opening width in the guide holes 3. This is to enable the rolling bodies 2 to roll on the rolling surfaces 4 without making sliding contact with the inner wall surfaces of the guide holes 3. Therefore, a gap exists between the outer peripheral surfaces of the rolling bodies 2 and the inner wall surfaces of the guide holes 3.

The rolling bodies 2 are connected so as to be integrated in a rotating direction of the guide plate 1 by a connection member 6. In the example shown in FIG. 1, the connection member 6 includes an annular portion 6a, and two arm portions 6b that extend outward in the radial direction from the annular portion 6a. The arm portions 6b extend in directions opposite to each other on a diameter of the annular portion 6a. On the other hand, a boss portion 1a that projects in the axial direction is formed in a center portion of the guide plate 1, and the annular portion 6a is rotatably fitted to an outer peripheral side of the boss portion 1a. That is, the connection member 6 is rotatably supported by the guide plate 1 in a state in which a center position of the connection member 6 substantially corresponds to the rotation center O of the guide plate 1 or an axis passing through the rotation center O. When a cover described later is integrated with the guide plate 1, the connection member 6 may be rotatably supported by the cover.

Figure 2:
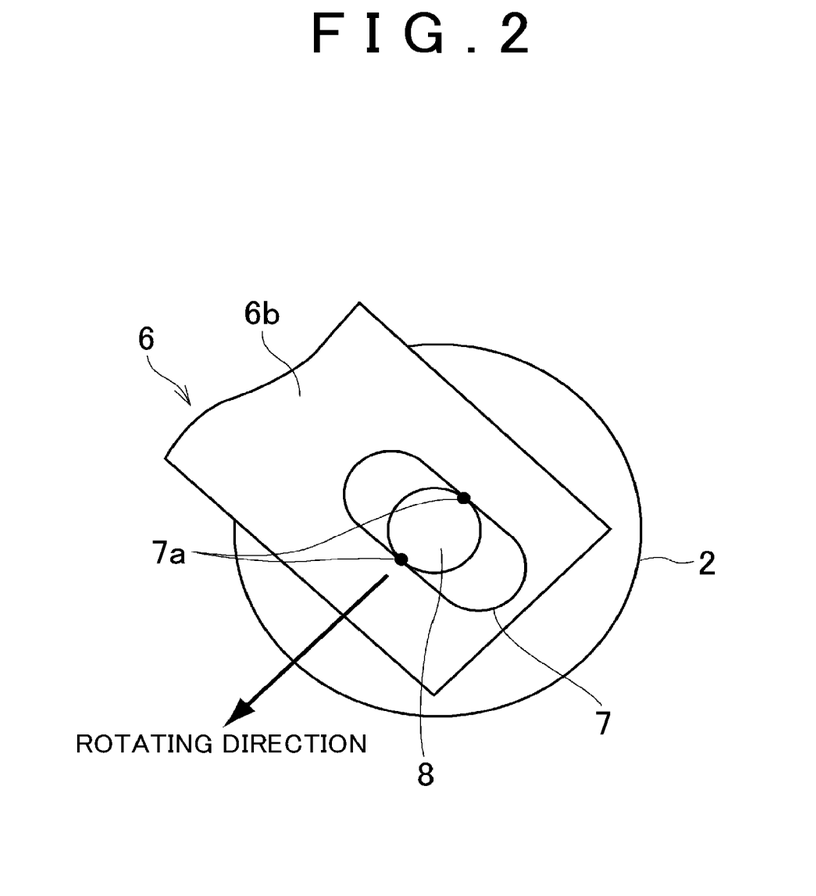
FIG. 2 is a partial view illustrating one example of a connection position between a connection member and a rolling body.

The rolling bodies 2 are connected to distal end portions of the arm portions 6b, respectively, and more precisely, at the same radial positions from the center of the annular portion 6a. A connection structure of the rolling bodies 2 will be described below. Each of the rolling bodies 2 engages with the connection member 6 so as to be movable in the radial direction of the guide plate 1. As shown in FIG. 2, each of the arm portions 6b is provided with an elongated hole 7 that is oriented in a longitudinal direction of the arm portion 6b (the radial direction of the guide plate 1). The elongated hole 7 is one example of a hole. A connection pin 8 that projects in the axial direction is provided in a center portion of each of the rolling bodies 2. An outer diameter of the connection pin 8 is substantially the same as or slightly smaller than a width of the elongated hole 7. By inserting the connection pin 8 into the elongated hole 7, each of the rolling bodies 2 engages with the connection member 6. In the above state, the rolling bodes 2 are connected to each other by the connection member. Note that the connection pin 8 is positioned in a longitudinally intermediate portion of the elongated hole 7, and is in point contact or line contact with flat inner surfaces 7a that face each other in parallel in the elongated hole 7. The flat inner surfaces 7a are surfaces oriented in the radial direction of the guide plate 1, or surfaces oriented in a direction parallel to the radial direction. Accordingly, the rolling bodies 2 are connected so as to move integrally in the rotating direction (or the circumferential direction) of the guide plate 1, and are also made movable only within the guide holes 3 in the radial direction of the guide plate 1. Each of the rolling bodies 2 is configured to be movable in the radial direction of the guide plate 1 as described above in order not to disturb free rolling (a pendulum motion) of the rolling body 2 along the rolling surface 4.

The connection member 6 and the two rolling bodies 2 form one constituent body 9 that is integrated in the rotating direction. The center of the connection member 6 substantially corresponds to the center of the guide plate 1. Thus, when the respective rolling bodies 2 have the same distance from the center of the guide plate 1, a position of the center of gravity of the constituent body 9 substantially corresponds to the rotation center O of the guide plate 1 or the axis passing through the rotation center O. In other words, the center of gravity of the constituent body 9 is positioned closer to the rotation center O of the guide plate 1 than a position of the center of gravity of any one of the rolling bodies 2. When the respective rolling bodies 2 do not have the same distance from the rotation center O of the guide plate 1, the position of the center of gravity of the constituent body 9 deviates from the axis passing through the rotation center O of the guide plate 1. However, an amount of the deviation is small, and it can be said that the center of gravity of the constituent body 9 substantially corresponds to the rotation center O of the guide plate 1.

Therefore, the embodiment shown in FIG. 1 is configured such that a moment that results from a weight of one of the rolling bodies 2 and rotates the connection member 6 about the rotation center O of the guide plate 1 is applied in a predetermined first rotating direction, and at the same time, a moment that results from a weight of the other of the rolling bodies 2 and rotates the connection member 6 about the rotation center O of the guide plate 1 is applied in a second rotating direction opposite to the first rotating direction. Since the directions of the moments are opposite to each other, torque that results from the weights of the rolling bodies 2 and rotates the connection member 6 or the constituent body 9 is reduced. When the center of gravity of the constituent body 9 corresponds to the rotation center of the guide plate 1, the torque that rotates the constituent body 9 with respect to the guide plate 1 is not generated.

Next, an operation of the above torsional vibration reducing device will be described. When the guide plate 1 rotates, the rolling bodies 2 held in the guide holes 3, respectively, rotate together with the guide plate 1, and a centrifugal force is applied to each of the rolling bodies 2. When the centrifugal force is relatively large, each of the rolling bodies 2 moves to a position farthest from the rotation center O of the guide plate 1 in the rolling surface 4, and is pressed against the rolling surface 4. Since the rolling bodies 2 are integrated with the connection member 6 in the rotating direction as described above, the connection member 6 also rotates together with the rolling bodies 2. The rolling bodies 2 move to distal end sides of the arm portions 6b along the elongated holes 7.

When the torque of the guide plate 1 fluctuates in the above state, the guide plate 1 vibrates (torsionally vibrates) in the rotating direction. Thus, relative acceleration in the rotating direction is generated in each of the rolling bodies 2, and each of the rolling bodies 2 rolls along the rolling surface 4 by an inertial force. Since the rolling surface 4 is the curved surface having a small radius of curvature as described above, the inertial force of the rolling bodies 2 is applied in a direction to suppress the vibration of the guide plate 1, and the torsional vibration is reduced. Since each of the rolling bodies 2 is connected to the connection member 6 with the connection pin 8 fitted to the elongated hole 7 of the connection member 6, and the connection pin 8 is only in point contact or line contact with the flat inner surfaces 7a in the rotating direction of the guide plate 1 or the connection member 6, the rolling body 2 can move in the radial direction of the guide plate 1, and a large resistance force is not applied to the rolling.

Figure 3:
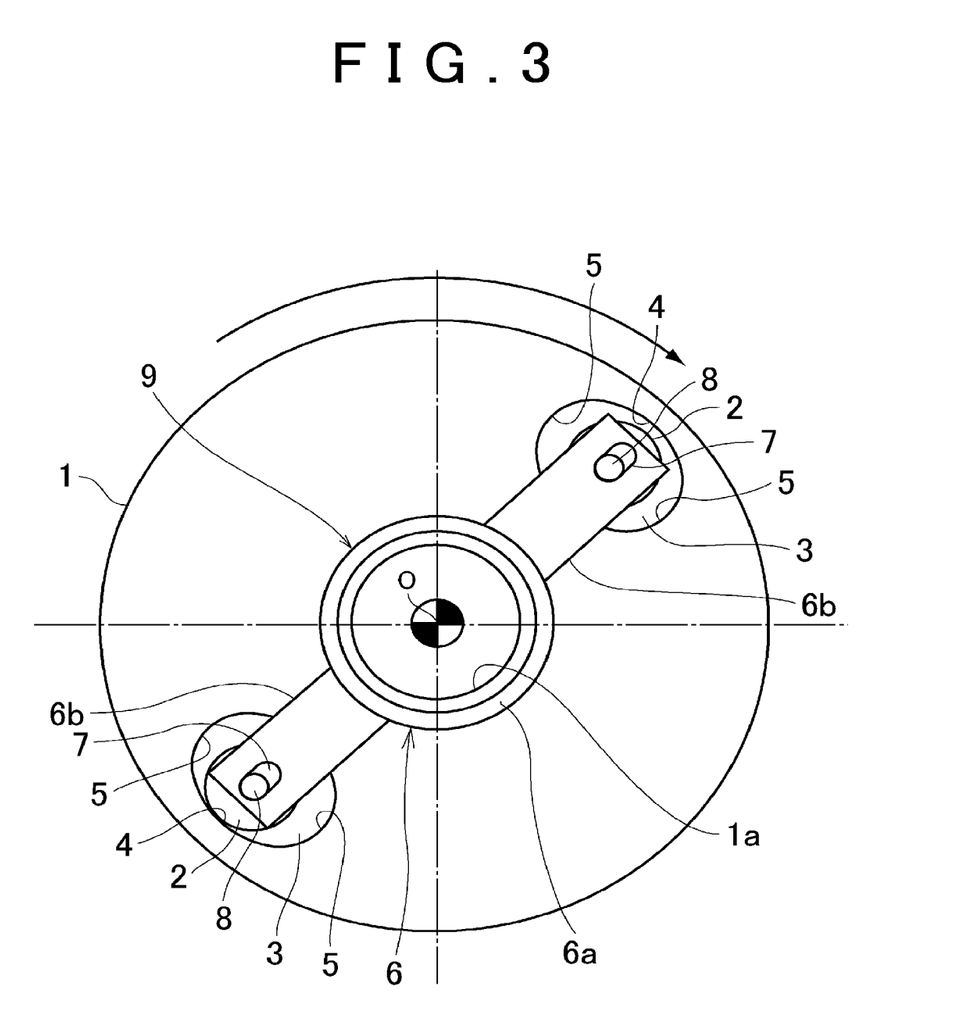
FIG. 3 is a schematic view illustrating one example of a state in which the rolling body is pressed against a rolling surface.

When the centrifugal force applied to each of the rolling bodies 2 is small due to a low rotation speed of the guide plate 1, gravity larger than the centrifugal force is applied in a direction to make the rolling body 2 fall in the guide hole 3. Since the rolling body 2 is connected to the connection member 6 and integrated with the connection member 6 with respect to the rotating direction of the guide plate 1, the rolling body 2 applies a moment to the connection member 6 according to its mass (that is, resulting from the weight). In this case, a moment obtained by the rolling body 2 positioned on one of right and left sides with the rotation center O of the guide plate 1 therebetween, and a moment obtained by the rolling body 2 positioned on the other side are oriented in directions opposite to each other. When the respective rolling bodies 2 have the same distance from the rotation center O of the guide plate 1, the moments become equal to each other and are canceled out. Thus, the torque that rotates the constituent body 9 composed of the rolling bodies 2 and the connection member 6 is not generated. In other words, the center of gravity of the constituent body 9 corresponds to or substantially corresponds to the rotation center O of the guide plate 1. Therefore, each of the rolling bodies 2 remains held at a predetermined position in the guide hole 3 as shown in FIG. 3, so that falling of the rolling body 2 toward the boundary surface 5, and collision of the rolling body 2 with the boundary surface 5 are avoided or suppressed. That is, collision sound by the rolling body 2 is prevented or suppressed. Even when the center of gravity of the constituent body 9 does not correspond to the rotation center of the guide plate 1, the center of gravity is positioned closer to the rotation center O of the guide plate 1 than the position of the center of gravity of the rolling body 2. Thus, even when a rotating moment resulting from the gravity is applied to the constituent body 9, the rotating moment becomes small. It is thus possible to reduce the collision of the rolling body 2 with the boundary surface 5, and an impact by the collision, and resultantly, to prevent or suppress the collision sound by the rolling body 2.

For example, as shown in FIG. 3, in a state in which one of the rolling bodies 2 is positioned below a horizontal plane passing through the rotation center of the guide plate 1, and the other of the rolling bodies 2 is positioned above the horizontal plane, the lower rolling body 2 moves to the distal end side of the arm portion 6b, and is positioned away from the center of the guide plate 1 (the connection member 6). On the other hand, the upper rolling body 2 moves to the rotation center O-side of the guide plate 1 along the elongated hole 7, and is positioned close to the center of the guide plate 1 (the connection member 6). In this case, a moment obtained by the lower rolling body 2 is larger than a moment obtained by the upper rolling body 2. Thus, the connection member 6 does not rotate in a direction in which the upper rolling body 2 falls in the guide hole 3. The collision of the rolling body 2 with the boundary surface 5 and abnormal sound resulting from the collision are prevented or suppressed.

Figure 4:
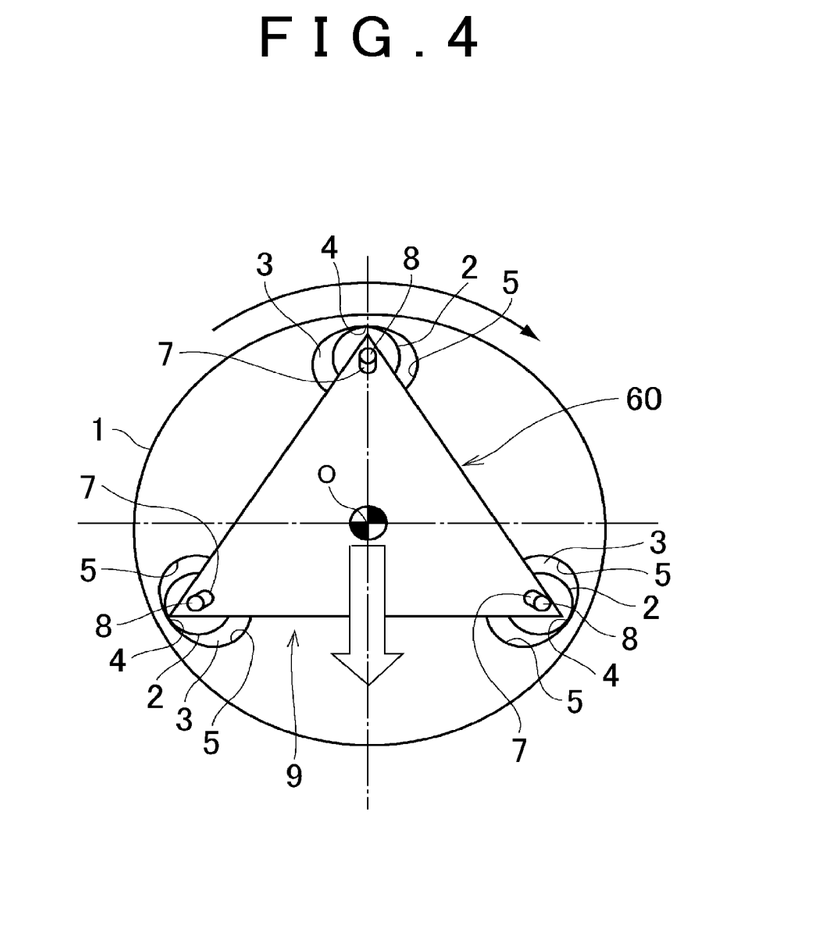
FIG. 4 is a schematic view illustrating another embodiment.

A vibration reduction force in the torsional vibration reducing device according to the embodiment is increased as a total mass or a total inertial moment of the rolling bodies 2 is larger. Thus, the number of the rolling bodies 2 is not limited to two as described in the above embodiment, and three or more rolling bodies may be provided. By setting the number of the rolling bodies 2 to three or more, a different structure for supporting the connection member 6 by the guide plate 1 from a structure described in the above embodiment can be employed. FIG. 4 shows one example thereof. The example shown therein is an example in which the three rolling bodies 2 are provided. The three guide holes 3 are formed at even intervals in the circumferential direction of the guide plate 1 in portions on an outer peripheral side of the guide plate 1. The guide holes 3 have the same configuration as that of the guide holes 3 shown in FIG. 1. Each of the guide holes 3 includes the rolling surface 4 and the boundary surfaces 5.

A connection member 60 that connects the three rolling bodies 2 is provided. In short, the connection member 60 is a member whose position of the center of gravity corresponds to the rotation center O of the guide plate 1 or the axis passing through the rotation center O. A disk or annular body, or a plate body having a regular polygonal shape can be employed. In the example shown in FIG. 4, the connection member 60 is formed by a plate body having a regular triangular shape. The rolling bodies 2 are attached to three apex portions (corner portions) of the connection member 60, respectively. A connection structure of the rolling bodies 2 to the connection member 60 may be similar to the connection structure in the above embodiment shown in FIG. 1 and FIG. 2. The elongated hole 7 that is oriented in the radial direction of the guide plate 1 is formed in each of the three corner portions of the connection member 60. The connection pin 8 that is provided in the center portion of each of the rolling bodies 2 is loosely fitted to the elongated hole 7.

In the example shown in FIG. 4, the center of gravity of the constituent body 9 composed of the connection member 60 and the three rolling bodies 2 held thereby also corresponds to or substantially corresponds to the rotation center O of the guide plate 1. Therefore, a moment that results from a weight of the rolling body(s) 2 positioned on the right side in FIG. 4 with respect to the rotation center O of the guide plate 1 and rotates the connection member 60 about the rotation center O, and a moment that results from a weight of the rolling body(s) 2 positioned on the left side in FIG. 4 with respect to the rotation center O of the guide plate 1 and rotates the connection member 60 about the rotation center O are applied in directions opposite to each other. Since a difference between the moments becomes the torque that rotates the connection member 60 or the constituent body 9, the torque is small. Especially when the center of gravity of the constituent body 9 corresponds to the rotation center O, the torque that results from gravity and rotates the constituent body 9 becomes zero.

Each of the rolling bodies 2 is in contact with any position on the inner wall surfaces of each of the guide holes 3. Each of the rolling bodies 2 can move within each of the guide holes 3. Therefore, the connection member 60 that connects the plurality of rolling bodies 2 is supported by the guide plate 1 via the respective rolling bodies 2. The connection member 60 is supported by the guide plate 1 so as to be rotatable (or swingable) relative to the guide plate 1 within a range in which each of the rolling bodies 2 moves within the guide hole 3. In the example shown in FIG. 4, the supporting structure as described above is employed instead of the supporting structure using the annular portion 6a and the boss portion 1a as shown in FIG. 1.

In the example shown in FIG. 4, when a sufficiently large centrifugal force is applied to each of the rolling bodies 2 with the guide plate 1 rotating at a relatively high speed, each of the rolling bodies 2 is pressed against the rolling surface 4. When the torsional vibration is generated by the fluctuations in the torque of the guide plate 1, each of the rolling bodies 2 reciprocates along the rolling surface 4. In this case, since the rolling bodies 2 are integrated in the rotating direction (a swing direction) by the connection member 60, the rolling bodies 2 integrally reciprocate (swing). On the other hand, when the centrifugal force applied to each of the rolling bodies 2 is small due to a low rotation speed of the guide plate 1, the rolling body 2 is made fall by gravity. However, since the center of gravity of the constituent body 9 composed of the rolling bodies 2 and the connection member 60 connecting the rolling bodes 2 substantially corresponds to the rotation center O of the guide plate 1 or the axis passing through the rotation center O, a force for rotating the connection member 60 (the torque) is hardly generated. Since the rolling bodies 2 are integrated in the rotating direction by the connection member 60 that is not rotated as described above, none of the rolling bodies 2 falls toward the boundary surface 5 in the guide hole 3. Therefore, even when the rotation speed of the guide plate 1 is low, a situation in which the rolling body 2 violently collides with the boundary surface 5, and the collision sound is resultantly generated is surely prevented or suppressed.

Figure 5:
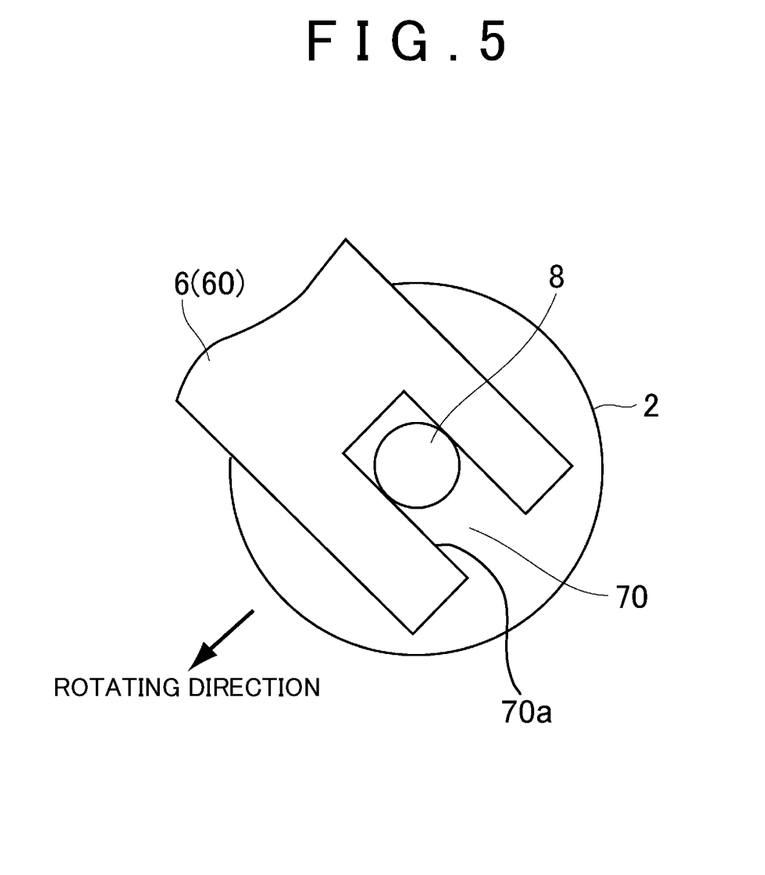
FIG. 5 is a partial view illustrating another example of the connection position between the connection member and the rolling body.
Figure 6:
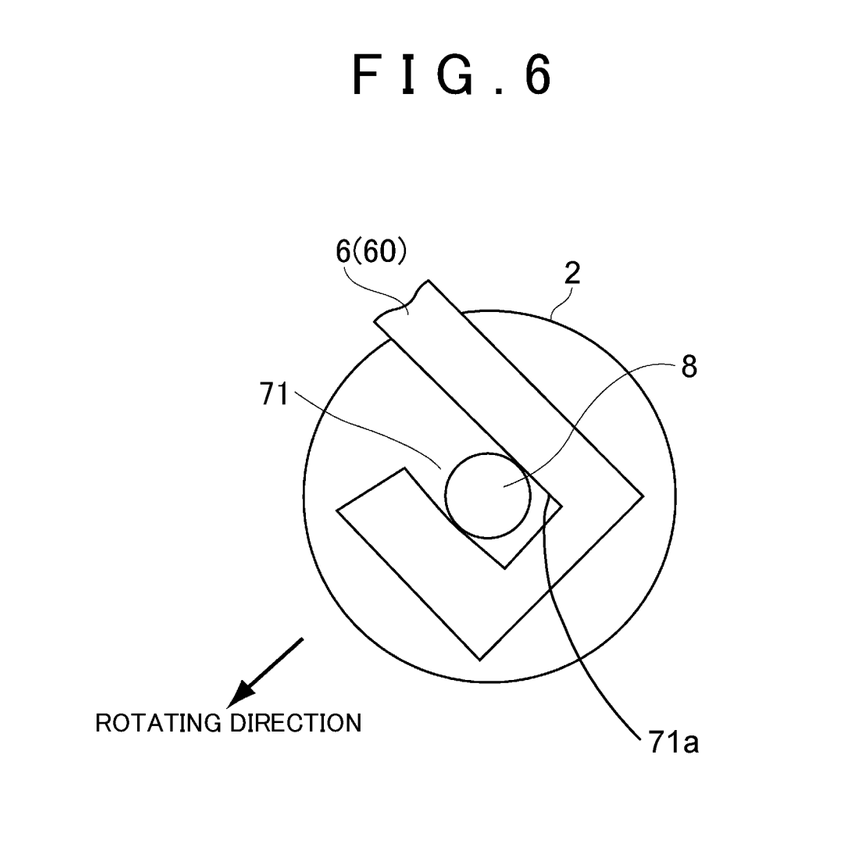
FIG. 6 is a partial view illustrating yet another example of the connection position between the connection member and the rolling body.

Yet another example of the torsional vibration reducing device according to the embodiment will be described. The rolling bodies 2 only need to be connected so as to be integrated in the rotating direction of the guide plate 1 by the connection member 6 (60), and be made movable at least within the guide holes 3 or more in the radial direction of the guide plate 1. Therefore, a slit or a groove may be employed instead of the elongated hole 7. Examples thereof are shown in FIG. 5 and FIG. 6. The example shown in FIG. 5 is an example in which a slit 70 that is elongated in the radial direction of the guide plate 1 and opens outward in the radial direction is formed in the connection member 6 (60), and the connection pin 8 is inserted into the slit 70. Also, the example shown in FIG. 6 is an example in which a bend portion is formed in a portion on an outer peripheral side of the connection member 6 (60), a slit 71 that is elongated in the radial direction of the guide plate 1 and opens inward in the radial direction is formed in the bend portion, and the connection pin 8 is inserted into the slit 71. In both of the examples shown in FIG. 5 and FIG. 6, the connection pin 8 is in line contact with flat inner surfaces 70a, 71a facing each other of each of the slits 70, 71, and the rolling bodies 2 are connected so as to be integrated in the rotating direction of the guide plate 1 by the connection member 6 (60). The slits 70, 71 correspond to the hole in the embodiment.

Figure 7:
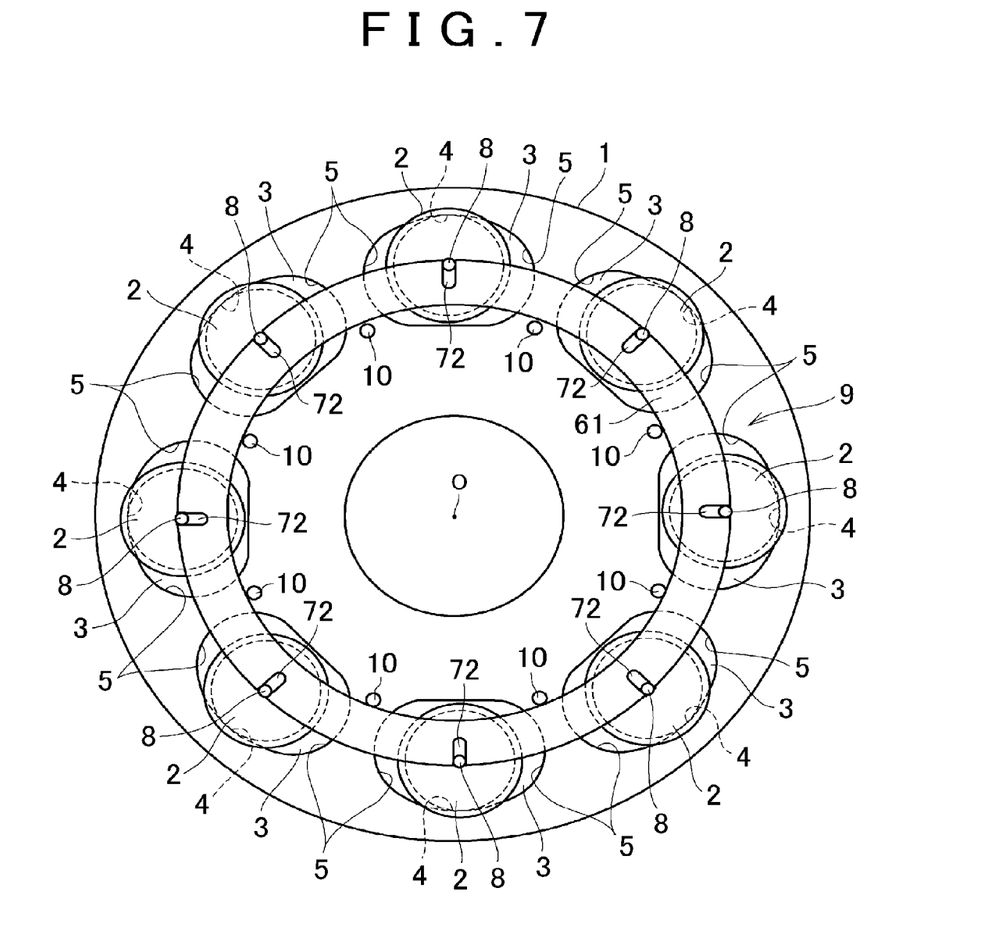
FIG. 7 is a front view illustrating an example in which the connection member is formed in an annular shape.

The shape of the connection member may be changed to an appropriate shape according to need as long as the above function can be provided. For example, as shown in FIG. 7, an annular connection member 61 can be employed. A plurality (the same number as that of the rolling bodies 2) of slits 72 that are oriented inward in the radial direction from an outer peripheral surface are formed at the same intervals as intervals of the rolling bodies 2 in an outer peripheral portion of the connection member 61. The connection pin 8 provided in the center portion of each of the rolling bodies 2 is loosely inserted into each of the slits 72. Therefore, the rolling bodies 2 are connected so as to be integrated in the rotating direction of the guide plate 1 by the connection member 61, and can move into contact with and away from the rolling surfaces 4 in the radial direction of the guide plate 1.

In a configuration shown in FIG. 7, the three or more (eight in FIG. 7) rolling bodies 2 are provided. Thus, the connection member 61 can be supported by the guide plate 1 via the respective rolling bodies 2 such that the center of gravity of the connection member 61 substantially corresponds to the rotation center O of the guide plate 1 or the axis passing through the rotation center O. Additionally, a supporting structure that causes the center of gravity of the connection member 61 to more accurately correspond to the rotation center O of the guide plate 1 or the axis passing through the rotation center O is employed. That is, a plurality (the same number as that of the guide holes 3) of support pins 10 are provided in portions between the respective guide holes 3, and at positions on a circumference having the same radius as an inner diameter of the connection member 61 about the rotation center O of the guide plate 1. The connection member 61 is rotatably supported by the support pins 10 with an inner peripheral surface of the connection member 61 being in contact with the support pins 10.

In an example shown in FIG. 7, the center of gravity of the constituent body 9 composed of the connection member 61 and the plurality of rolling bodies 2 held thereby also corresponds to or substantially corresponds to the rotation center O of the guide plate 1. Therefore, a moment that results from weights of the rolling bodies 2 positioned on the right side in FIG. 7 with respect to the rotation center O of the guide plate 1 and rotates the connection member 61 about the rotation center O, and a moment that results from weights of the rolling bodies 2 positioned on the left side in FIG. 7 with respect to the rotation center O of the guide plate 1 and rotates the connection member 61 about the rotation center O are applied in directions opposite to each other. Since a difference between the moments becomes the torque that rotates the connection member 61 or the constituent body 9, the torque is small. Especially when the center of gravity of the constituent body 9 corresponds to the rotation center O, the torque that results from gravity and rotates the constituent body 9 becomes zero.

In the example shown in FIG. 7, flanges are formed on opposite sides of each of the rolling bodies 2 in the axial direction, so that each of the rolling bodies 2 is configured in an "H" shape in section. In a state in which each of the rolling bodies 2 is pressed against the rolling surface 4, the flanges are caught by the opposite side surfaces of the guide plate 1. The rolling bodies 2 are thereby prevented from escaping from the guide holes 3.

Figure 8:
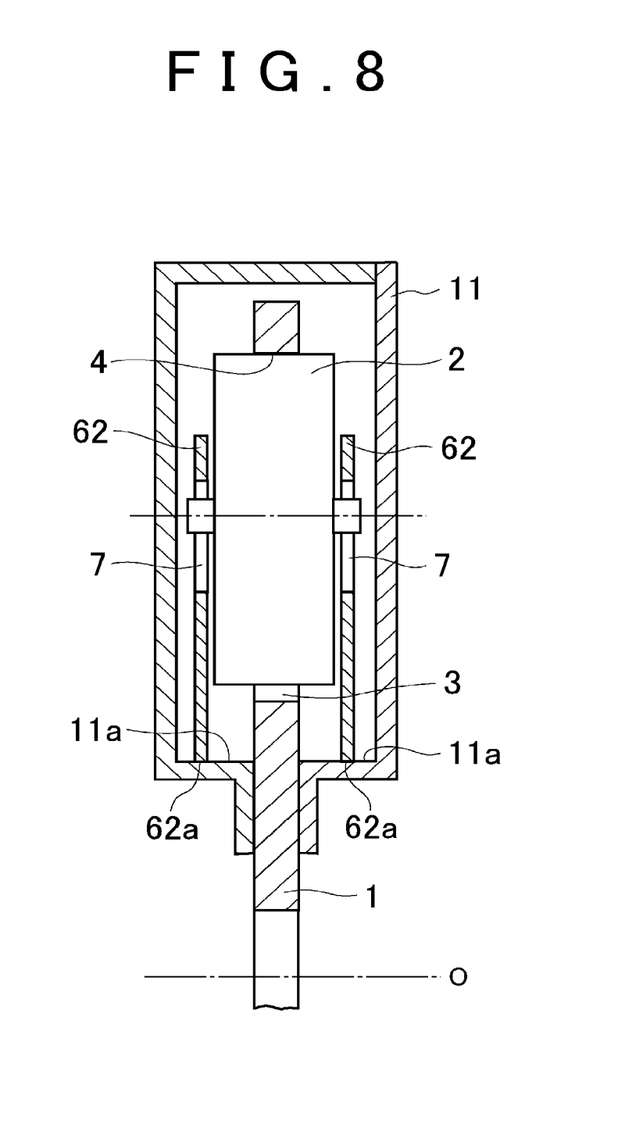
FIG. 8 is a partial sectional view illustrating an example in which a cover is provided.

The connection member may be supported by a member integrated with the guide plate 1 instead of the guide plate 1. An example thereof is shown in FIG. 8. The example shown therein is an example in which a cover 11 that covers an outer peripheral portion of the guide plate 1 including the rolling body 2 in a liquid-tight state is provided, and a connection member 62 is rotatably supported by the cover 11. To be more specific, the cover 11 is an annular hollow member whose outer diameter is larger than an outer diameter of the guide plate 1, and whose inner diameter is smaller than a diameter of a position where the guide hole 3 is provided. An inner portion of the cover 11 has a rectangular shape in section as shown in FIG. 8. The inner portion has a width in which an axial length of the rolling body 2 and the connection member 62 are accommodated without being touched. The connection member 62 may employ any of a configuration having the annular portion 6a as shown in FIG. 1, or an annular configuration as shown in FIG. 7. The connection member 62 has a circular inner peripheral surface 62a. The inner peripheral surface 62a is rotatably fitted to an inner surface 11a that is oriented outward in the radial direction out of inner surfaces of the cover 11. The center of gravity of the connection member 62 corresponds to the rotation center O of the guide plate 1 or the axis passing through the rotation center O in a state in which the connection member 62 is supported by the cover 11 as described above.

In the configuration shown in FIG. 7 and the configuration shown in FIG. 8, the directions of the moments that result from the weights of the respective rolling bodies 2 and are applied to the connection member 61 (62) are opposite to each other on the right side and the left side with the rotation center O of the guide plate 1 therebetween. Therefore, the connection member 61 (62) is not rotated by the weights of the rolling bodies 2, so that the falling of any of the rolling bodies 2 toward the boundary surface 5 that is the inner wall surface of the guide hole 3, and generation of the collision sound resulting therefrom are avoided or suppressed. Even when the center of gravity of the constituent body 9 composed of the rolling bodies 2 and the connection member 61 (62) radially deviates from the rotation center O of the guide plate 1, an amount of the deviation is small. Moreover, any of the rolling bodies 2 is in contact with the inner surface of the guide hole 3 to generate not a little sliding resistance. Therefore, the constituent body 9 hardly rotates. Even if the constituent body 9 rotates, the constituent body 9 rotates with a small moment. Thus, even when the rolling body 2 collides with the boundary surface 5, generation of the collision sound or the abnormal sound at an uncomfortable level is avoided or suppressed.

Although the invention has been described above based on the plurality of embodiments, the invention is not limited to the above embodiments. For example, another arm portion that extends in a cross shape may be provided on the connection member 6 shown in FIG. 1, and the arm portion may be engaged with a predetermined position of the guide plate 1 so as to be rotatable with respect to the guide plate 1. Also, all of the rolling bodies 2 do not need to have the same shape, or to be arranged at even intervals. The rolling bodies 2 may have different sizes, shapes, or masses from each other as long as the center of gravity of the constituent body 9 composed of the rolling bodies 2 and the connection member 6 corresponds to or substantially corresponds to the rotation center O of the guide plate 1. Moreover, the connection pin 8 provided on each of the rolling bodies 2 may be formed integrally with the rolling body 2 in addition to the pin fitted to the rolling body 2. The support pins 10 shown in FIG. 7 may be disposed on an outer peripheral side of the connection member 61 so as to support the connection member 61 from the outer peripheral side. Similarly, in the case of the configuration in which the connection member is disposed within the cover, the connection member may be supported from the outer peripheral side by bringing an outer peripheral surface of the connection member into rotatable contact with an inner surface on the outer side in the radial direction out of the inner surfaces of the cover. The plurality of connection members may be provided. That is, any two or more rolling bodies out of the plurality of rolling bodies may be connected by a first connection member, and the other remaining rolling bodies of the plurality of rolling bodies may be connected by a second connection member. Also, the above torsional vibration reducing device may be configured as appropriate without departing from the scope of the invention.

What is claimed is:

1. A torsional vibration reducing device comprising:
a rotating body configured to receive torque and rotate, the rotating body having a plurality of guide holes, the plurality of guide holes being independently provided so as to be spaced apart from each other at a predetermined interval in a circumferential direction of the rotating body,
the rotating body including a plurality of rolling bodies, the plurality of rolling bodies being accommodated in the plurality of spaced apart guide holes, respectively, and the plurality of rolling bodies being configured to roll in a rotating direction of the rotating body when the torque fluctuates while the rotating body is rotating;
a connection member that connects the plurality of rolling bodies such that the plurality of rolling bodies move integrally in the rotating direction of the rotating body, the connection member being supported so as to be reciprocally swingable in the rotating direction, a first moment that results from a weight of any one of the plurality of rolling bodies and rotates the connection member in a first rotating direction about a center of rotation of the rotating body, a second moment that results from a weight of the other of the plurality of rolling bodies and rotates the connection member in a second rotating direction opposite to the first rotating direction about the center of rotation of the rotating body, and the first moment and the second moment being applied to the connection member; and
a constituent body composed of the connection member and the plurality of rolling bodies connected by the connection member, a center of gravity of the constituent body substantially corresponding to the center of rotation of the rotating body,
wherein inner wall surfaces define each of the plurality of guide holes, the inner wall surfaces include a rolling surface and boundary surfaces that are positioned on opposite sides of the rolling surface and continuous to the rolling surface.

2. The torsional vibration reducing device according to claim 1, wherein the connection member is configured such that the center of gravity of the constituent body is positioned closer to the center of rotation of the rotating body than a position of the center of gravity of any one of the plurality of rolling bodies.

3. The torsional vibration reducing device according to claim 1, wherein
the connection member is supported by the rotating body or a member integrated with the rotating body, and
two rolling bodies provided on sides opposite to each other with respect to the center of rotation of the rotating body are connected by the connection member.

4. The torsional vibration reducing device according to claim 1, wherein the plurality of rolling bodies include at least three rolling bodies, and the at least three rolling bodies being arranged in the rotating direction of the rotating body.

5. The torsional vibration reducing device according to claim 1, wherein
the connection member has a hole, the hole being disposed at a position shifted in a radial direction of the rotating body from a center portion of the connection member, and
each of the rolling bodies is held by the connection member so as to be movable in the racial direction of the rotating body in point contact or line contact with an inner surface of the hole on both of front and rear sides in the rotating direction of the rotating body.

6. The torsional vibration reducing device according to claim 1, wherein the connection member is supported by the rotating body so as to rotate relative to the rotating body about the center of rotation of the rotating body.

7. The torsional vibration reducing device according to claim 1, further comprising a cover that covers a position where the rolling bodies are provided in an outer peripheral portion of the rotating body, the cover being provided integrally with the rotating body,
 wherein the connection member is accommodated in the cover, and the connection member is supported by the cover so as to rotate relative to the rotating body about the center of rotation of the rotating body.

\* \* \* \* \*